US006924932B2

(12) United States Patent
Nakajima (10) Patent No.: US 6,924,932 B2
(45) Date of Patent: Aug. 2, 2005

(54) BINOCULAR DEVICE (76) Inventor: Hideaki Nakajima, 3-13 Tukama-cho 1-chome, Okaya-shi, Nagano 394-0026 (JP)

( * ) Notice: Subject to any disclaimer, the term of this patent is extended or adjusted under 35 U.S.C. 154(b) by 228 days.

(21) Appl. No.: 10/161,864

(22) Filed: Jun. 4, 2002

(65) Prior Publication Data

US 2004/0125443 A1 Jul. 1, 2004

(30) Foreign Application Priority Data

Nov. 19, 2001 (JP) .................................... 2001-352506

(51) Int. Cl.[7] ............................................. G02B 23/00
(52) U.S. Cl. ...................................... 359/407; 359/363
(58) Field of Search ................................. 359/363, 400, 359/407, 418, 480, 482; 345/7, 8

(56) References Cited

U.S. PATENT DOCUMENTS 5,581,399 A * 12/1996 Abe ............................ 359/410
5,654,752 A * 8/1997 Yamazaki ................. 348/208.8
5,963,369 A * 10/1999 Steinthal et al. ............ 359/410
6,067,190 A * 5/2000 Kelly .......................... 359/407
6,487,012 B1 * 11/2002 Khoshnevis et al. ........ 359/407
6,646,799 B1 * 11/2003 Korniski et al. ............ 359/407

FOREIGN PATENT DOCUMENTS

JP 11-112851 * 4/1999 ........... G02B/23/00

* cited by examiner

Primary Examiner—Mark A. Robinson
(74) Attorney, Agent, or Firm—Cowan Liebowitz & Latman, P.C.; Mark Montague (57) ABSTRACT A binocular device arranged to enable images recorded by an image recording unit to be reproduced and checked on the site without using a reproduction device provided separately from the binocular device. The binocular device has an image pickup unit for obtaining an image formed from observation light at a first image plane position in one of two observation optical systems, and a display unit for displaying at a focal plane position in an ocular optical system of the other observation optical system the image obtained by the image pickup unit. The image obtained by the image pickup unit can be checked through the display unit on the site immediately after being obtained.

10 Claims, 8 Drawing Sheets

BINOCULAR DEVICE

BACKGROUND OF THE INVENTION

1. Field of the Invention

The present invention generally relates to a binocular device, and more particularly, to a binocular device incorporating an image pickup device for imaging of observation light captured with an observation optical system of a binocular device, and a display device for displaying an image formed by the image pickup device.

2. Description of the Related Art

When a person observes through a binocular device an object such as a landscape or a building existing a distance away from the observation point, he or she may wish to record an image of the observed object. Binocular devices designed to enable image recording in such a situation are known. For example, Japanese Patent Application Laid-open Nos. 11-64740 and 11-112851 disclose such devices, i.e., binocular devices with image recording means.

The binocular devices having such an image recording means perform image recording in such a manner that observation light at a first image plane in one of two observation optical systems is captured with an image pickup device and an image captured with the image pickup device is recorded by the image recording means.

To enable enjoyment of images recorded with the above-described binocular device having the image recording means, however, it is necessary to output each recorded image to a separate reproduction device from the binocular device. To enable reproduction and check of recorded images on the site, therefore, it is necessary to prepare a reproduction device separately from the binocular device.

SUMMARY OF THE INVENTION

An object of the present invention is to provide a binocular device designed to enable an image recorded by an image recording means to be reproduced and checked on the site without using a reproduction device prepared separately from the binocular device.

To achieve this object, according to the present invention, there is provided a binocular device characterized by having a pair of observation optical systems each including an objective optical system and an ocular optical system, an image pickup means for obtaining an image formed from observation light at a focal plane position in one of the pair of observation optical systems, and a display means for displaying at a first image plane position in the ocular optical system of the other observation optical system the image obtained by the image pickup means. One binocular device thus arranged can convert an image formed from observation light into image data and can display the image from the image data. The displayed image data can be observed.

Preferably, the image pickup means is displaced between the first image plane position in the observation optical system and a retracted position escaped from the optical path of the observation optical system. If the binocular device is arranged in this manner, an object of observation can be observed through the observation optical system when the image pickup means is in the retracted position escaped from the optical path of the observation optical system.

The image pickup means may be placed in a position escaped from the optical path of the observation optical system, which position is optically equivalent to the first image plane position of the observation optical system, and reflection means for causing observation light at the first image plane position to travel to the image pickup means may be provided. If the binocular device is arranged in this manner, an image formed from observation light at the first image plane position can be obtained without displacing the image pickup means, e.g., an electronic circuit of a complicated structure.

Preferably, the reflection means for causing observation light to travel to the image pickup means is displaced between an inserted position in the optical path of the observation optical system and a retracted position escaped from the optical path of the observation optical system, and the reflection means causes observation light at the first image plane position to travel to the image pickup means when it is set in the inserted position. If the binocular device is arranged in this manner, observation light traveling toward the ocular optical system is not blocked by the reflection means when the reflection means is in the retracted position escaped from the optical path of the observation optical system, thereby enabling the observation object to be observed through the ocular optical system.

Preferably, the reflection means for causing observation light to travel to the image pickup means is formed as a half-transmission mirror. If the binocular device is arranged in this manner, observation light at the first image plane position can be caused to travel to the image pickup means and the observation object can be simultaneously observed through the ocular optical system while the half-transmission mirror is in a state of being inserted in the observation optical path.

The binocular device may include an infrared cut filter which is displaced between a position to cover the image pickup surface of the image pickup means and a position not to cover the image pickup surface. If the binocular device is arranged in this manner, an image formed from infrared rays in observation light can be obtained when the image pickup surface is not covered with the infrared cut filter.

Preferably, the display means is displaced between the focal plane position of the ocular optical system in the other observation optical system and a retracted position escaped from the optical path of the other observation optical system. If the binocular device is arranged in this manner, the observation object can be observed through the optical path of the observation optical system when the display means is in the retracted position escaped from the observation optical path.

The display means may be placed in a position escaped from the optical path of the other observation optical system, which position is optically equivalent to the focal plane position in the ocular optical system of the other observation optical system, and reflection means for causing light from an image displayed on the display means to travel to the ocular optical system may be provided. If the binocular device is arranged in this manner, an image displayed on the display means from can be observed without displacing the display means, e.g., an electronic circuit of a complicated structure.

Preferably, the reflection means for causing light from an image displayed on the display means to travel to the ocular optical system is displaced between an inserted position in the optical path of the other observation optical system and a retracted position escaped from the optical path of the other observation optical system, and the reflection means causes light from an image displayed on the display means to travel to the ocular optical system when it is set in the inserted position. If the binocular device is arranged in this manner, observation light traveling toward the ocular optical system is not blocked by the reflection means when the reflection means is in the retracted position escaped from the optical path of the observation optical system, thereby enabling the observation object to be observed through the ocular optical system.

Preferably, the reflection means for causing light from an image displayed on the display means to travel to the ocular optical system is formed as a half-transmission mirror. If the binocular device is arranged in this manner, an image displayed on the display means and the observation object can be simultaneously observed through the ocular optical system.

Preferably, the binocular device may include a connection portion for outputting an image obtained by the image pickup means to an external device, thereby enabling the obtained image to be observed through an external monitor or the like.

To achieve above object, according to the other invention, there is provided a binocular device characterized by having a pair of observation optical systems each including an objective optical system and an ocular optical system, image pickup means for obtaining an image formed from observation light at a first image plane position in one of the pair of observation optical systems, and output means for outputting an image obtained by the image pickup means to an display device.

DESCRIPTION OF THE PREFERRED EMBODIMENT

An embodiment of the present invention will be described with reference to FIGS. 1 through 11.

Figure 1:
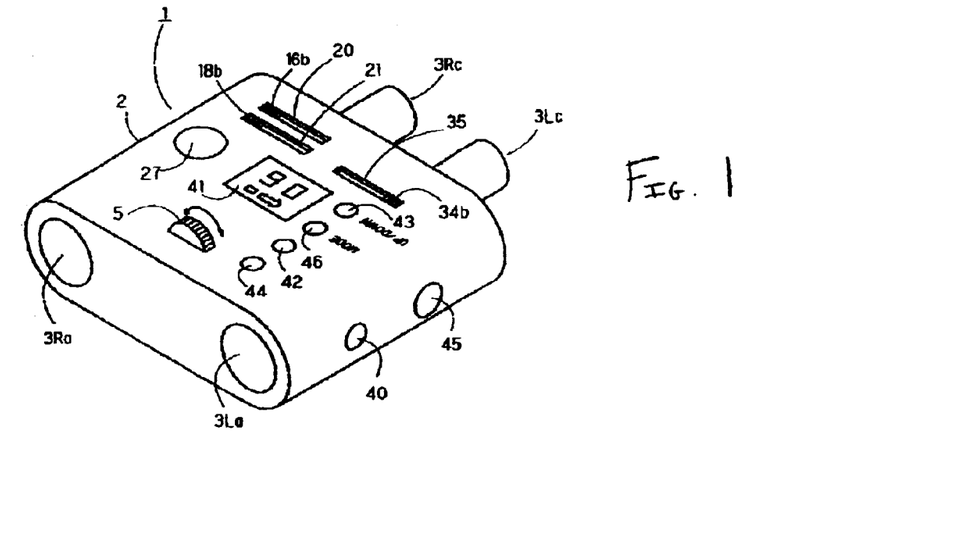
FIG. 1 is a diagram showing an external appearance of a binocular device in accordance with one embodiment of the present invention.
Figure 2:
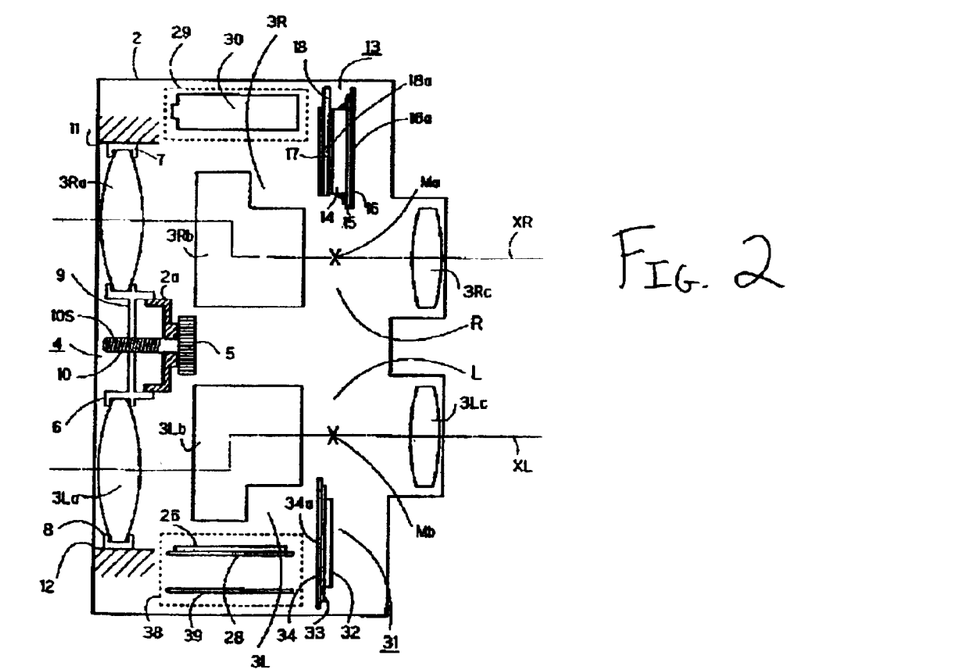
FIG. 2 is a diagram showing the internal structure of the binocular device of the present invention.

FIG. 1 shows an external appearance of a binocular device 1 in accordance with the present invention. The binocular device 1 has a casing 2. FIGS. 2 through 10 show a structure inside the casing 2, i.e., the internal structure of the binocular device 1.

The left-hand side and the right-hand side of each of the figures referred to in the following description correspond to a front side and a rear side, respectively, of the binocular device 1. Also, the half of the binocular device 1 on the right-hand side as viewed along the direction from the rear side to the front side is assumed to be the right side of the binocular device 1, and the other half as viewed along the same direction is assumed to be the left side of the binocular device 1.

The binocular device 1 has a pair of right and left observation optical systems 3R and 3L. The observation optical system 3R is constituted by an objective optical system 3Ra, an erecting optical system 3Rb, an ocular optical system 3Rc. Similarly, the other observation optical system 3L is constituted by an objective optical system 3La, an erecting optical system 3Lb, an ocular optical system 3Lc.

Observation light from an object of observation (not shown) existing in such a position as to be seen in the forward direction from the binocular device 1 enters the left and right objective optical systems 3Ra and 3La, travels through the erecting optical systems 3Rb and 3Lb, and exits the ocular optical systems 3Rc and 3Lc. An observer exists at the rear of the binocular device 1. The observer can observe the observation object by viewing images of the object through the ocular optical systems 3Rc and 3Lc generally in alignment with his or her right and left pupils. After entering the objective optical systems 3Ra and 3La, observation light is converged to form images at first image plane positions Ma and Mb between the erecting optical systems 3Rb and 3Lb and the ocular optical systems 3Rc and 3Lc. Observation light forming images at the first image plane positions Ma and Mb exits the ocular optical system 3Rc and 3Lc in a rearward direction. The ocular optical systems 3Rc and 3Lc have focal planes respectively positioned at the first image plane positions Ma and Mb. Consequently, the observer observes the images formed by the observation light at the first image plane positions Ma and Mb and magnified by the ocular optical systems 3Rc and 3Lc.

The erecting optical systems 3Rb and 3Lb have the function of erecting at the first image plane positions Ma and Mb images formed by the objective optical systems 3Ra and 3La in a state of being inverted about a vertical axis and about a horizontal axis. For example, each of the erecting optical systems 3Rb and 3Lb is formed by combining a Porro prism for inversion about a horizontal axis and a Porro prism for inversion about a vertical axis.

In the following description, the optical axis of the observation optical system 3R is referred to as "optical axis XR"; the optical axis of the observation optical system 3L "optical axis XL"; the optical path of the observation optical system 3R "observation optical path R"; and the optical path of the observation optical system 3L "observation optical path L".

When an adjusting knob 5 of a focusing mechanism 4 is turned clockwise or counterclockwise, i.e., in one of the directions of the arrows shown in FIG. 1, the objective optical systems 3Ra and 3La are displaced frontward or rearward along the optical axis XR and along the optical axis XL, respectively, in correspondence with the direction of this turning.

The objective optical systems 3Ra and 3La can be displaced frontward or rearward by operating the adjusting knob 5 to converge observation light from the object of observation at any distance from the binocular device 1 so that images of the object are formed at the first image plane positions Ma and Mb of the objective optical systems 3Ra and 3La.

The focusing mechanism 4 is constituted by the adjusting knob 5, an objective optical system holding member 6 on which the objective optical systems 3Ra and 3La are held, and a supporting member 2a through which the adjusting knob 5 is supported on the casing 2.

The objective optical system holding member 6 has objective optical system holding frames 7 and 8 which are provided in a configuration similar to that of the frame of a pair of spectacles as viewed from the front or from the rear, and which are right and left circular frames in which the objective optical systems 3Ra and 3La are respectively held. The right and left objective optical system holding frames 7 and 8 are connected to each other by a connecting portion 9.

The adjusting knob 5 has a screw shaft 10 having a threaded portion 10S. The screw shaft 10 of the adjusting knob 5 is supported on the supporting member 2a in a state of being maintained parallel to the optical axes XR and XL. The threaded portion 10S and the connecting portion 9 are connected by screwing the threaded portion 10S into the connecting portion 9. When the adjusting knob 5 is turned in one of the directions of the arrows, the objective optical system holding member 6 is displaced frontward or rearward in correspondence with the direction of turning of the adjusting knob 5 by being led by the threaded portion 10S. Thus, the objective optical systems 3Ra and 3La can be displaced by operating the adjusting knob 5 so that observation light from the object of observation is converged to form images at the first image plane positions Ma and Mb, as mentioned above.

The objective optical system holding member 6 has a right portion of the objective optical system holding frame 7 and a left portion of the objective optical system holding frame 8 respectively guided by guide portions 11 and 12 formed on the casing 2 so that the objective optical system holding member 6 is stopped from rotating about the screw shaft 10 while being allowed to be displaced forward or rearward. Consequently, when the adjusting knob 5 is turned, the objective optical system holding member 6 guided by the guide portions 11 and 12 can be displaced along the optical axes XR and XL without rotating about the screw shaft 10 by following the turn of the adjusting knob 5.

The binocular device 1 has an image pickup unit 13 for converting an image formed from observation light at the first image plane position Ma of the observation optical system 3R into an image signal. The image pickup unit 13 has a charge-coupled device (CCD) 14 provided as an image pickup means, a printed circuit board 15 on which the CCD 14 is directly mounted, a CCD supporting plate 16 to which the printed circuit board 15 is attached, an infrared cut filter 17 for cutting infrared rays, a filter supporting plate 18 to which the infrared cut filter 17 is attached, and a plate spring 19. The plate spring 19 is attached to the CCD supporting plate 16 and is in contact with a right-end edge of the filter supporting plate 18 when the binocular device 1 is not in a night vision mode (described below), as shown in FIGS. 3 and 4.

Two guide slits 20 and 21 are formed in a top side portion of the casing 2 so as to extend parallel to each other along a direction perpendicular to the optical axis XR while being spaced apart from each other along the front-rear direction. A guide projection 16a which engages with the guide slit 20 is formed on an upper end edge portion of the CCD supporting plate 16. A guide projection 18a which engages with the guide slit 21 is formed on an upper end edge portion of the filter supporting plate 18. An upper end portion of the guide projection 16a engaging with the guide slit 20 and an upper end portion of the guide projection 18a engaging with the guide slit 21 respectively project beyond the upper surface of the casing 2. These guide projection upper end portions are respectively formed as an operating portion 16b of the CCD supporting plate 16 and an operating portion 18b of the filter supporting plate 18. The operating portion 16b is operated so as to slide rightward or leftward in the guide slit 20, thereby displacing the CCD 14 rightward or leftward. Similarly, the operating portion 18b is operated so as to slide rightward or leftward in the guide slit 21, thereby displacing the infrared cut filter 17 rightward or leftward.

Figure 3:
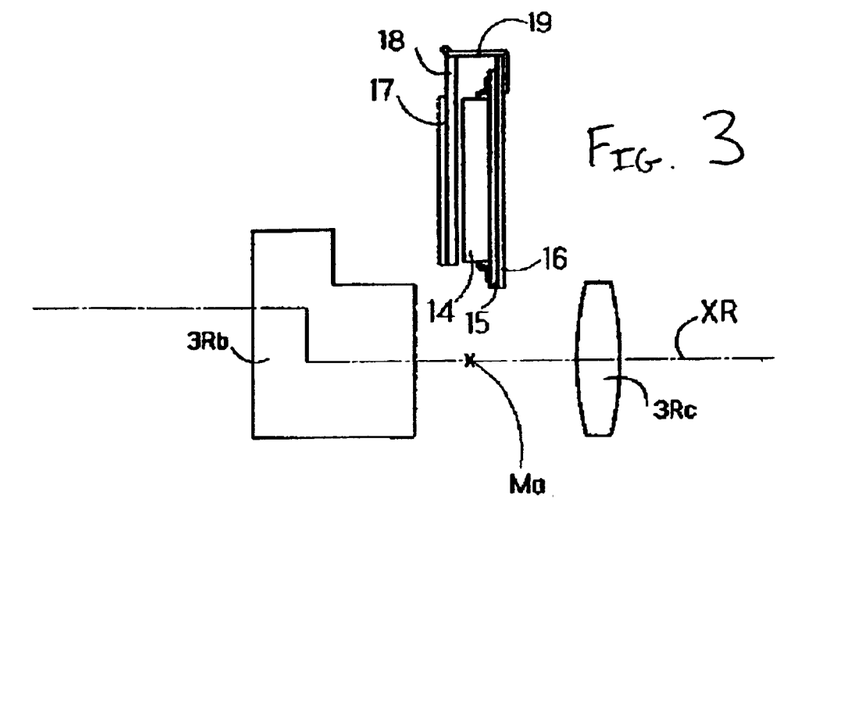
FIG. 3 is a diagram showing the internal structure of the binocular device of the present invention.

FIG. 3 shows a state in which the CCD 14 and the infrared cut filter 17 are positioned by being retracted from the observation optical path R so as not to block observation light. When the image pickup unit 13 is in this state, observation light travels to the ocular optical system 3Rc, so that the observer can observe the object of observation through the observation optical system 3R by viewing an image of the object through the ocular optical system 3Rc.

Figure 4:
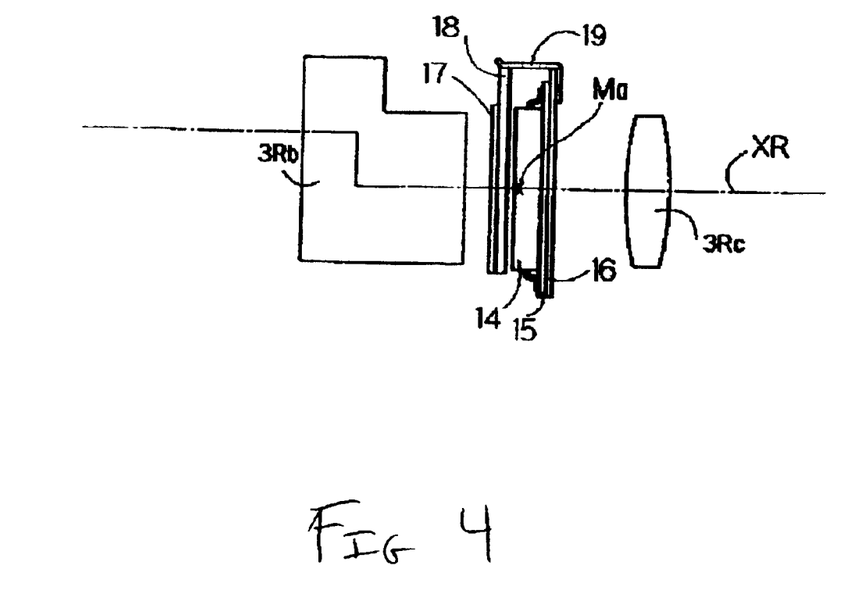
FIG. 4 is a diagram showing the internal structure of the binocular device of the present invention.

FIG. 4 shows a state in which the CCD 14 is set in an inserted position corresponding to the first image plane position Ma, with the image pickup surface of the CCD 14 at the first image plane position Ma covered with the infrared cut filter 17. When the image pickup unit 13 is in this state, infrared light is removed from observation light by the infrared cut filter 17 and the observation light being removed infrared light thereafter travels to the image pickup surface of the CCD 14 to form an image on the same.

Figure 5:
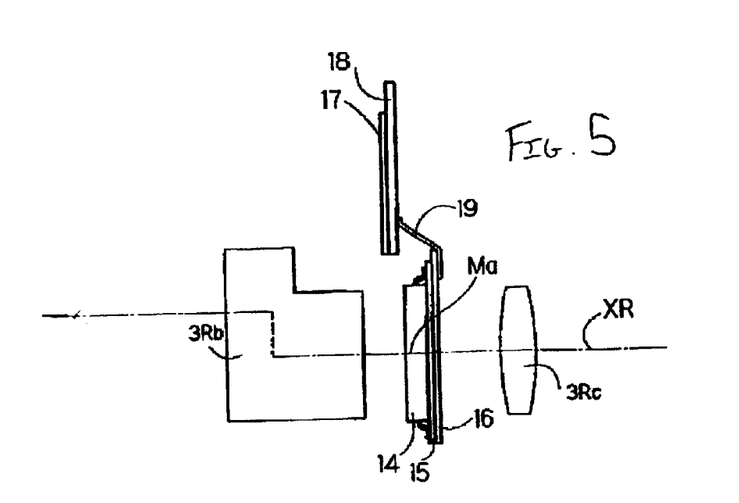
FIG. 5 is a diagram showing the internal structure of the binocular device of the present invention.

FIG. 5 shows a state in which the CCD 14 is set in the inserted position corresponding to the first image plane position Ma but the image pickup surface of the CCD 14 is not covered with the infrared cut filter 17. When the image pickup unit 13 is in this state, observation light from the object of observation, including infrared light, travels to the CCD 14 to form an image on the same.

Figure 6:
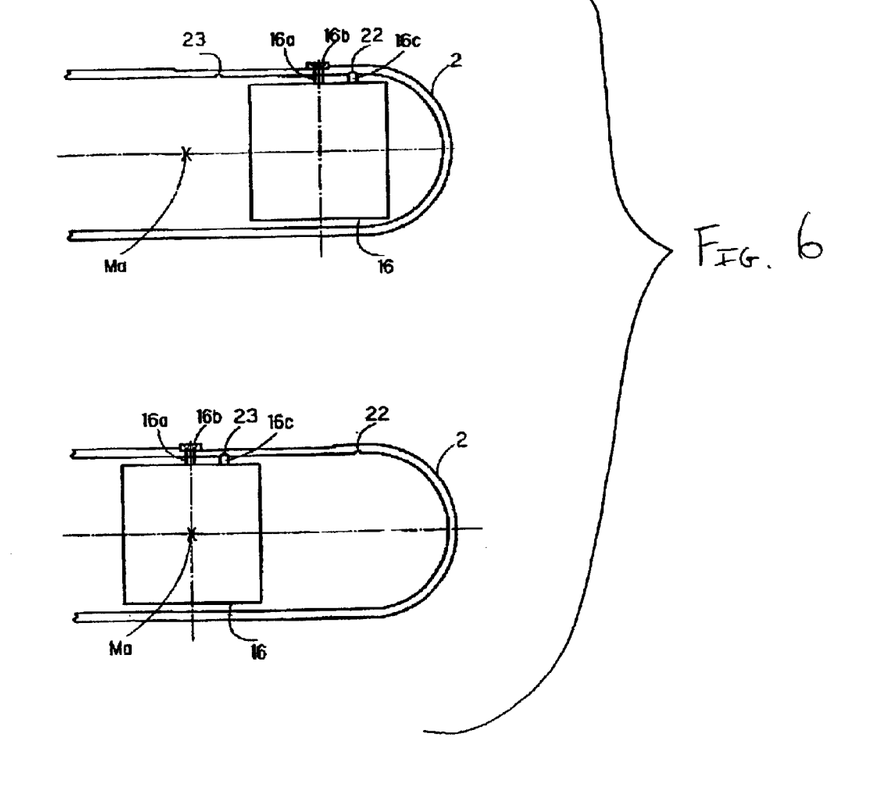
FIG. 6 is a diagram showing the internal structure of the binocular device of the present invention.

Referring to FIG. 6, a projection 16c is formed on an upper edge portion of the CCD supporting plate 16 while recesses 22 and 23 are formed in the inner surface of the casing 2. The recess 22 engages with the projection 16c when the CCD 14 is in the retracted position escaped from the observation optical path R. The recess 23 engages with the projection 16c when the CCD 14 is in the inserted position corresponding to the first image plane position Ma. When the CCD supporting plate 16 is in the position shown in FIG. 3, i.e., the retracted position escaped from the observation optical path R, or in the position shown in FIG. 4 or 5, i.e., the inserted position corresponding to the first image plane position Ma, the projection 16c and the recess 22 or 23 are maintained in the engaged state to stop the CCD supporting plate 16 from moving rightward or leftward even if the binocular device 1 is inclined or vibrated. The engagement between the projection 16c and the recess 22 or 23 corresponds to a click mechanism.

Figure 7:
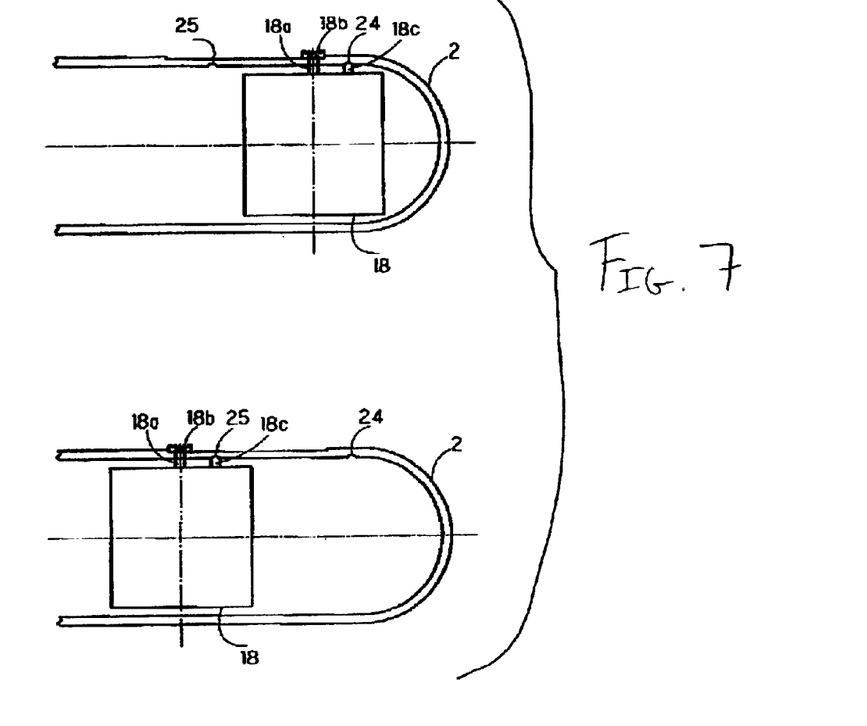
FIG. 7 is a diagram showing the internal structure of the binocular device of the present invention.

Similarly, referring to FIG. 7, a projection 18c is formed on an upper edge portion of the filter supporting plate 18 while recesses 24 and 25 are formed in the inner surface of the casing 2. The recess 24 engages with the projection 18c when the infrared cut filter 17 is in the retracted position escaped from the observation optical path R. The recess 25 engages with the projection 18c when the infrared cut filter 17 is in the position to cover the image pickup surface of the CCD 14 in the inserted position corresponding to the first image plane position Ma. When the filter supporting plate 18 is in the position shown in FIG. 3 or FIG. 5, i.e., the retracted position escaped from the observation optical path R, or in the inserted position shown in FIG. 4 to cover the image pickup surface of the CCD 14 in the inserted position corresponding to the first image plane position Ma, the projection 18c and the recess 24 or 25 are maintained in the engaged state to stop the filter supporting plate 18 from moving rightward or leftward even if the binocular device 1 is inclined or vibrated. The engagement between the projection 18c and the recess 24 or 25 corresponds to a click mechanism.

To change the state of the image pickup unit 13 from that shown in FIG. 3 to that shown in FIG. 4, the leftward sliding operation of the operating portion 16b is performed. The CCD 14 is thereby set in the inserted position corresponding to the first image plane position Ma. In this sliding operation of the operating portion 16b, the operating portion 16b is moved against a force from the engagement between the projection 16c of the CCD supporting plate 16 and the recess 22. At this time, a force is also exerted on the filter supporting plate 18 through the plate spring 19 to displace the filter supporting plate 18 leftward. The force from the engagement between the projection 18c and the recess 24 is set smaller than the force exerted on the filter supporting plate 18 by the operation of the operating portion 16b, thereby enabling the filter supporting plate 18 to be disengaged from the recess 24 and displaced leftward together with the CCD supporting plate 16.

When the CCD 14 is in the inserted position corresponding to the first image plane position Ma as shown in FIG. 4, the CCD supporting plate 16 is positioned by the engagement between the projection 16c and the recess 23 so as not to move rightward or leftward, as described above. The filter supporting plate 18 is also positioned by the above-described engagement between the projection 18c and the recess 25 so as not to move rightward or leftward, as described above.

The filter supporting plate 18 is moved rightward by performing the rightward sliding operation of the operating portion 18b to displace the infrared cut filter 17 from the state shown in FIG. 4, i.e., the state of being maintained in the inserted position corresponding to the first image plane position Ma to cover the image pickup surface of the CCD 14, to the position shown in FIG. 5, i.e., the retracted position escaped from the observation optical path R. At this time, a force to displace the CCD supporting plate 16 rightward through the plate spring 19 is produced. However, the force for maintaining the engagement between the projection 16c and the recess 23 is set larger than the force exerted on the CCD supporting plate 16 from the filter supporting plate 18, thereby enabling the CCD supporting plate 16 to be maintained in the inserted position corresponding to the first image plane position Ma. To set only the CCD 14 in the inserted position corresponding to the first image plane position Ma from the state shown in FIG. 3, only the CCD supporting plate 16 is displaced toward the first image plane position Ma by performing the leftward sliding operation of the operating portion 16b while holding the operating portion 18b by a finger tip or the like so as to prevent the filter supporting plate 18 from being displaced with the displacement of the CCD supporting plate 16.

Image data formed on the CCD 14 from observation light is transferred to an image memory 26 to be stored in the same. That is, when a switching-on operation is performed with the release button 27 while the CCD 14 is in the inserted position corresponding to the first image plane position Ma as shown in FIG. 4 or 5, the image data formed on the CCD 14 is recorded by being transferred to the image memory 26. For example, a flash memory is used as the image memory 26. The image memory 26 is mounted on a printed circuit board 28.

When an image pickup operation with the CCD 14 is performed, the infrared cut filter 17 may be retracted from the position corresponding to the image pickup surface as shown in FIG. 5 to enable infrared light to be also taken in as image data. Thus, an infrared image of an object of observation can be obtained, for example, in the nighttime, that is, in a situation where the quantity of light to be converted into image data is insufficient.

The image pickup unit 13 is placed so that the image pickup surface of the CCD 14 and the film surface of the infrared cut filter 17 are perpendicular to the optical axis XR. When the image pickup unit 13 is retracted escaped from the observation optical path R, a space 29 is formed inside the casing 2 by being surrounded by the erecting optical system 3Rb, the image pickup unit 13, etc. A battery 30 provided as a power source for the binocular device 1 is placed in the space 29.

A complementary metal-oxide-semiconductor (C-MOS) device may be used in place of the CCD 14 described above as an image pickup means in this embodiment.

The binocular device 1 has a display unit 31 for displaying at the first image plane position Mb in the observation optical system 3L an image obtained by the image pickup unit 13. The display unit 31 is constituted by a liquid crystal display panel 32 provided as a display means, a printed circuit board 33 on which the liquid crystal display panel 32 is directly mounted, and a panel supporting plate 34 to which the printed circuit board 33 is attached. The display surface of the liquid crystal display panel 32 is set on the ocular optical system 3Lc side to be viewed through the ocular optical system 3Lc.

A guide slit 35 is formed in a top side portion of the casing 2 so as to extend parallel along a direction perpendicular to the optical axis XL. A guide projection 34a which engages with the guide slit 35 is formed on an upper edge portion of the panel supporting plate 34. An upper end portion of the guide projection 34a engaging with the guide slit 35 projects beyond the upper surface of the casing 2. The upper end portion of the guide projection 34 is formed as an operating portion 34b of the panel supporting plate 34.

The operating portion 34b is operated so as to slide rightward or leftward in the guide slit 35. The liquid crystal display panel 32 is thereby displaced between a retracted position escaped from the observation optical path L shown in FIG. 8, at which it does not block the observation optical path L, and an inserted position corresponding to the first image plane position Mb shown in FIG. 9.

Figure 10:
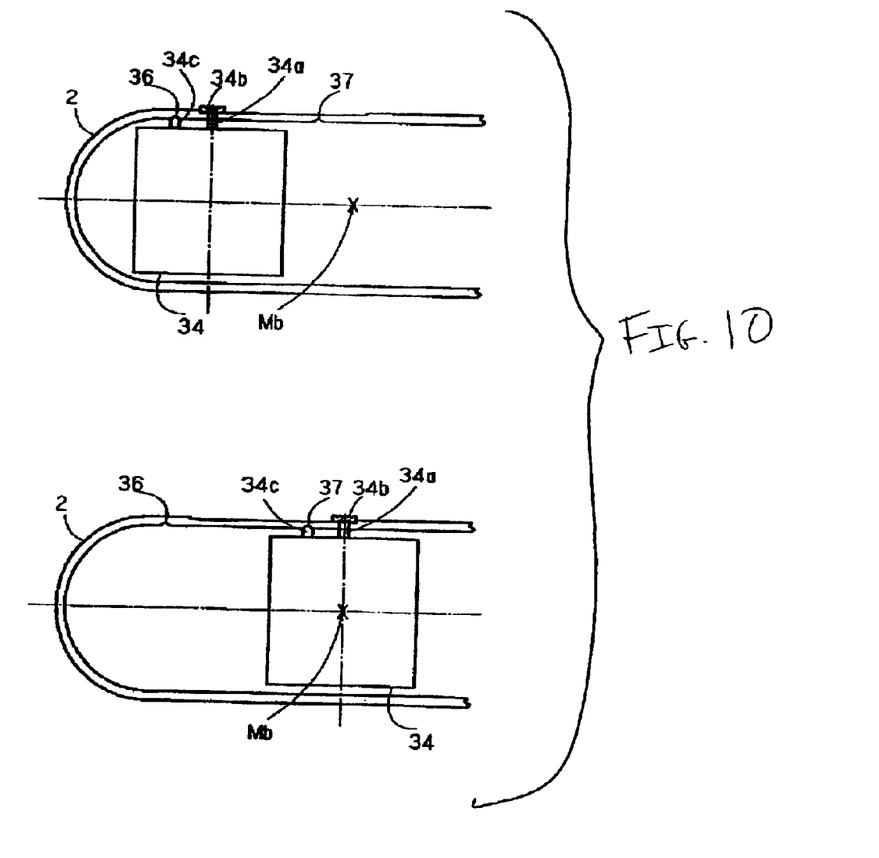
FIG. 10 is a diagram showing the internal structure of the binocular device of the present invention.

A projection 34c is formed on an upper edge portion of the panel supporting plate 34, as shown in FIG. 10. On the other hand, recesses 36 and 37 are formed in the inner surface of the casing 2, as shown in FIG. 10. The recess 36 engages with the projection 34c when the liquid crystal panel 32 is in the retracted position escaped from the observation optical path L. The recess 37 engages with the projection 34c when the liquid crystal panel 32 is in the inserted position corresponding to the first image plane position Mb.

Figure 8:
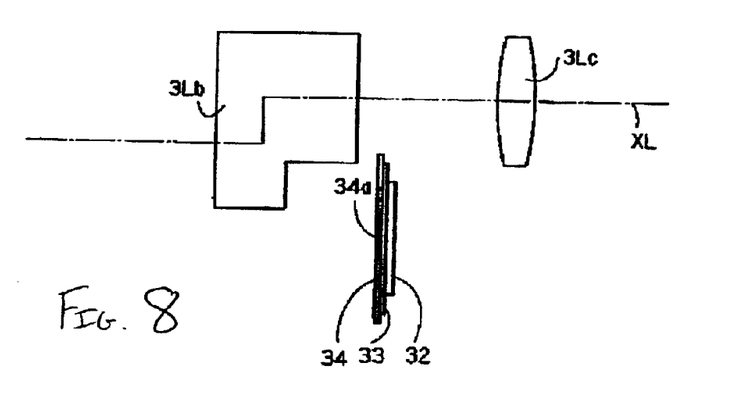
FIG. 8 is a diagram showing the internal structure of the binocular device of the present invention.
Figure 9:
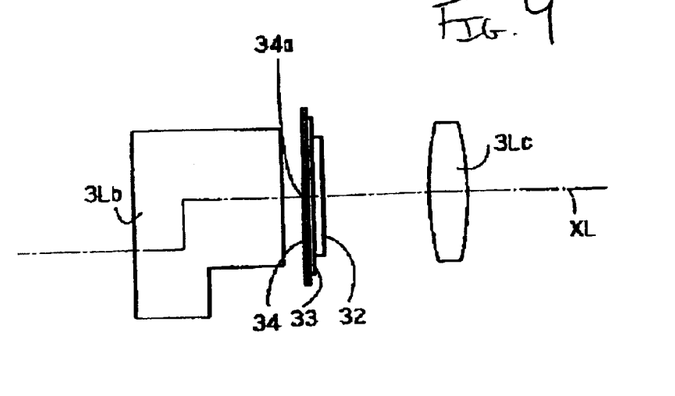
FIG. 9 is a diagram showing the internal structure of the binocular device of the present invention.

When the liquid crystal panel 32 is in the position shown in FIG. 8, i.e., the retracted position escaped from the observation optical path L, or in the position shown in FIG. 9, i.e., the inserted position corresponding to the first image plane position Mb, the projection 34c and the recess 36 or 37 are maintained in the engaged state to stop the panel supporting plate 34 from moving rightward or leftward even if the binocular device 1 is inclined or vibrated. The engagement between the projection 34c and the recess 36 or 37 corresponds to a click mechanism.

In the display unit 31, when the liquid crystal display panel 32 is operated while being maintained in the inserted position corresponding to the first image plane position Mb, an image recorded in the image memory 26 is displayed on the liquid crystal display panel 32 to be observed through the ocular optical system 3Lc.

A cathode-ray tube (CRT) or the like may be used in place of the liquid crystal display panel 32 described above as a display means in this embodiment.

The display unit 31 is placed so that the display surface of the liquid crystal display panel 32 is perpendicular to the optical axis XL. When the display unit 31 is retracted escaped from the observation optical path L, a space 38 is formed in front of the liquid crystal display unit 31 inside the casing 2 by being surrounded by the erecting optical system 3Lb, the display unit 31, etc. The image memory 26 and the printed circuit board 28 on which the image memory 26 is mounted are placed in the space 38. A control circuit 39 for controlling the operation of the binocular device 1 is also placed in this space 38.

Figure 11:
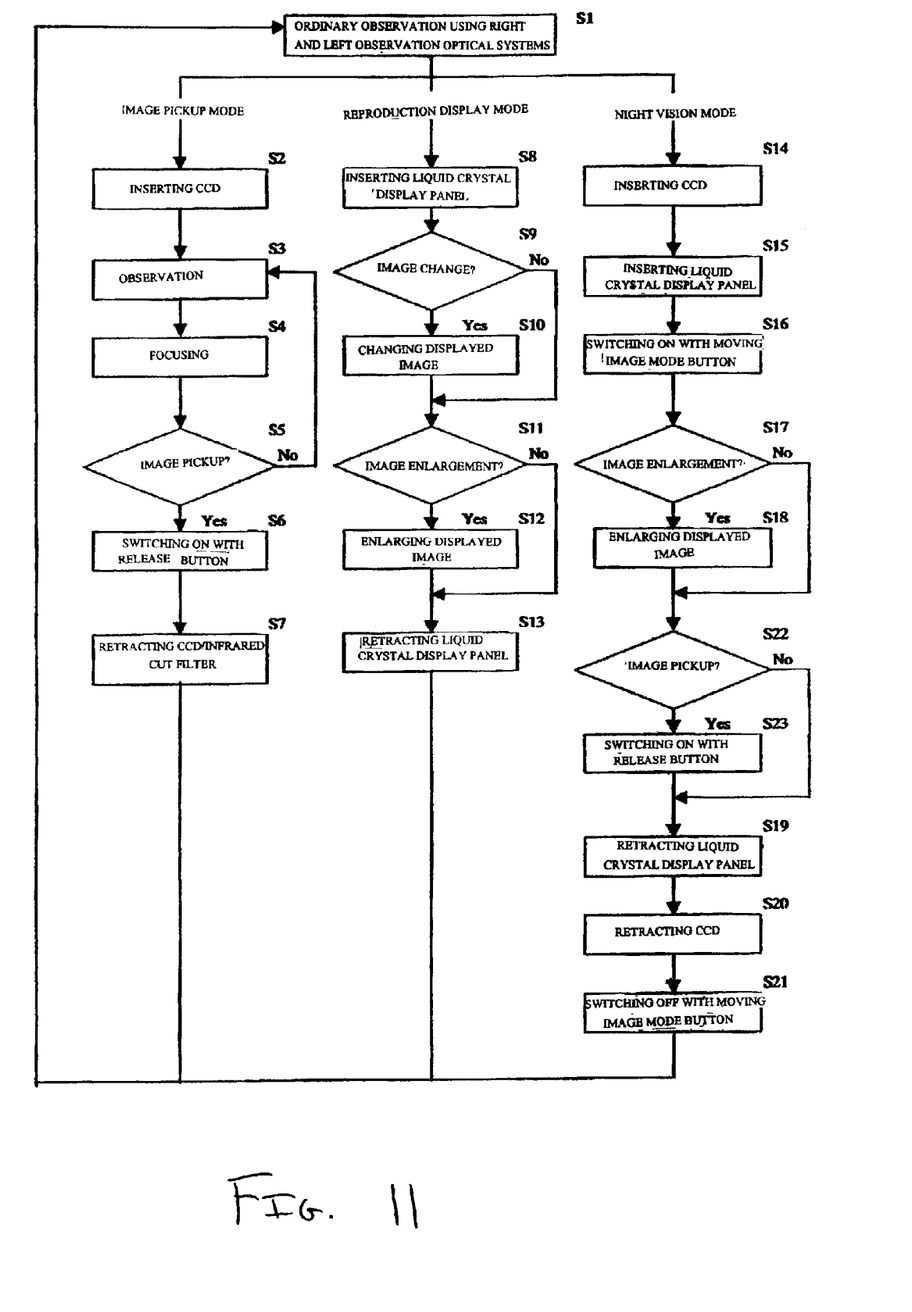
FIG. 11 is a diagram showing a method of operating the binocular device of the present invention.

A method of operating the binocular device 1 will next be described with reference to the flowchart shown in FIG. 11.

Operations performed for ordinary observation (S1), i.e., direct observation of an object performed by an observer through the observation optical systems 3R and 3L, will first be described. To enable this ordinary observation, the CCD 14 and the infrared cut filter 17 are set in the retracted positions escaped from the observation optical path R and the liquid crystal display panel 32 is also displaced to the retracted position escaped from the observation optical path L. That is, both the rightward sliding operations of the operating portions 16b and 18b on the image pickup unit 13 side are performed to displace the CCD supporting plate 16 and the filter supporting plate 18 rightward, and the leftward sliding operation of the operating portion 34b on the display unit 31 side is also performed to displace the panel supporting plate 34 leftward.

When the CCD 14 and the infrared cut filter 17 are retracted from the observation optical path R in the above-described manner and when the liquid crystal panel 32 is also retracted from the observation optical path L, observation light entering the objective optical systems 3Ra and 3La travels into the ocular optical systems 3Rc and 3Lc, thereby enabling the observation object to be directly observed through the observation optical systems 3R and 3L including the ocular optical systems 3Rc and 3Lc.

Operations in the case of using the image pickup unit 13 and the display unit 31 will next be described. A power switch 40 is first turned on before use of the image pickup unit 13 and the display unit 31.

Operations in the case where an image is obtained through the image pickup unit 13 (in a mode shown as an image pickup mode in the figures) will be described.

The leftward sliding operation of the operating portion 16b is first performed on the image pickup unit 13 side to set the CCD 14 in the inserted position corresponding to the first image plane position Ma, with the image pickup surface covered with the infrared cut filter 17 (S2).

When the binocular device 1 is in this state, observation light entering the objective optical system 3Ra is blocked by the CCD 14 and cannot reach the ocular optical system 3Rc, so that the observation object cannot be observed through the ocular optical system 3Rc. In the other observation optical system 3L, however, observation light entering the objective optical system 3La travels to the ocular optical system 3Lc without being blocked, thereby enabling the observer to observe the observation object through the ocular optical system 3Lc (S3).

Since the same image as the image of the observation object observed through the ocular optical system 3Lc is imaged on the image pickup surface of the CCD 14, the observer performs focusing by turning the adjusting knob 5 while viewing the observed image through the observation optical system 3L so that the observed images are in focus at the first image plane positions Ma and Mb (S4).

When the observer determines that the desired image pickup condition has been achieved (YES in S5), he or she performs the switching-on operation with the release button 27. The image obtained through the CCD 14 is thereby transferred to the image memory 26 to be recorded (S6). The image is stored and recorded in a compressed state in the image memory 26. The number of images recorded in the image memory 26 is indicated on a liquid crystal display 41.

The CCD 14 and the infrared cut filter 17 are retracted from the observation optical path R (S7). The binocular device 1 is thereby set in the ordinary observation condition (S1).

Operations in the case where an image stored in the image memory 26 is reproduced (in a mode shown as a reproduction display mode in the figures) will be described.

The rightward sliding operation of the operating portion 34b is performed on the display unit 31 side to set the liquid crystal display panel 32 in the inserted position corresponding to the first image plane position Mb (S8). When the liquid crystal display panel 32 is in the inserted position corresponding to the first image plane position Mb, observation light traveling toward the ocular optical system 3Lc is blocked by the liquid crystal display panel 32, so that the observation object cannot be observed through the ocular optical system 3Lc.

When an image reproduction switch 42 is turned on while the liquid crystal display panel 32 is in the inserted position corresponding to the first image plane position Mb, an image stored in the image memory 26 is displayed on the liquid crystal display panel 32. Since the liquid crystal display panel 32 is in the inserted position corresponding to the first image plane position Mb, the image displayed thereon can be observed through the ocular optical system 3Lc.

If the observer wishes to view recorded images other than the image presently displayed (YES in S9), he or she may perform a switching-on operation with an image change button 43 (S10) to successively display images stored in the image memory 26. If the observer wishes to observe the displayed image in an enlarged state (YES in S11), he or she may perform a switching-on operation with an image enlargement button 44 to display the image in an enlarged state (S12). That is, the image is electronically enlarged to be observed at a power higher than the optical power set at the time of ordinary observation (S1).

The number of reproduced images is indicated on the liquid crystal display 41.

The liquid crystal display panel 32 is retracted from the observation optical path L (S13). The binocular device 1 is thereby set in the ordinary observation condition (S1).

Images obtained through the CCD 14 may be transmitted to an external monitor or an external device such as a computer via an external connection terminal 45 provided as a connection portion connected to the control circuit 39. The external connection terminal 45 may be connected to the printed circuit board 15 on which the CCD 14 is mounted or to the image memory 26.

Operations for observation in a situation where the quantity of observation light is insufficient, for example, a situation in the nighttime (in a mode shown as a night vision mode in the figures) will next be described.

The CCD 14 is first set in the inserted position corresponding to the first image plane position Ma, with the image pickup surface not covered with the infrared cut filter 17. That is, while the operating portion 18b is maintained at the position at which it is set by being slid rightward (S14), only the leftward sliding operation of the operating portion 16b is performed (S14).

The rightward sliding operation of the operating portion 34b is then performed to set the liquid crystal display panel 32 in the inserted position corresponding to the first image plane position Mb (S15).

When a switching-on operation is thereafter performed with a moving image mode button 46 (S16), real-time images obtained through the CCD 14 are displayed on the liquid crystal display panel 32. Since the image pickup surface of the CCD 14 is not covered with the infrared cut filter 17, an image formed from observation light from the observation object including infrared rays can be received through the image pickup surface of the CCD 14. Consequently, images formed by using infrared rays by the CCD 14 are displayed on the liquid crystal display panel 32. Thus, the binocular device 1 can be used as a night scope.

If the observer wishes to observe the displayed image in an enlarged state (YES in S17), he or she may press the image enlargement button 44 to observe the image in an electronically enlarged state (S18).

The liquid crystal display panel 32 is retracted from the observation optical path L (S19), the CCD 14 is also retracted from the observation optical path R (S20), and a switching-off operation is performed with the moving image mode button 46 (S21). The binocular device 1 is thereby set in the ordinary observation condition (S1).

If the observer wishes to record an infrared image observed on the liquid crystal display panel 32 (YES in S22), he or she may turn on the release switch 27 (YES in S23) to record the image in the image memory 26 (S22, S23).

Focusing is performed by operating the adjusting knob 5 while observing the image displayed on the liquid crystal display panel 32, as described above.

Figure 12:
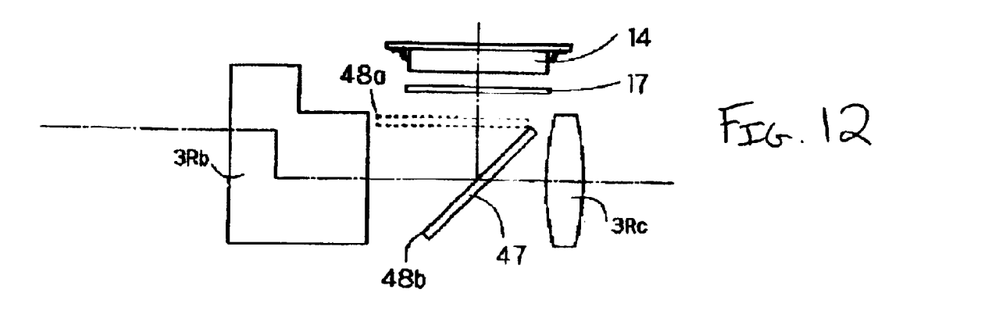
FIG. 12 is a diagram showing a binocular device in another embodiment of the present invention.

While the embodiment has been described with respect to the arrangement in which the CCD 14 is set in the inserted position corresponding to the first image plane position Ma in the observation optical path R to enable on observed image to be converted into image data, an arrangement such as shown in FIG. 12 may alternatively be used in which a all reflecting mirror 47 provided as a reflection means can be displaced between a retracted position 48a escaped from the observation optical path R, indicated by the dotted line, and an inserted position 48b in the observation optical path R, indicated by the solid line, in which, when the all reflecting mirror 47 is displaced to the inserted position 48b, an image formed from observation light reflected by the all reflecting mirror 47 is received by the CCD 14, and in which, when the all reflecting mirror 47 is displaced to the retracted position 48a, observation light travels to the ocular optical system 3Rc.

In this case, the CCD 14 is placed in a position optically equivalent to the first image plane position Ma in the reflected light optical path when the all reflecting mirror 47 is displaced to the inserted position 48b.

More specifically, "optically equivalent" denotes that the optical path length between the all reflecting mirror 47 displaced to the inserted position 48b and the CCD 14 and the optical path length between the all reflecting mirror 47 displaced to the inserted position 48b and the first image plane position Ma are equal to each other.

Figure 13:
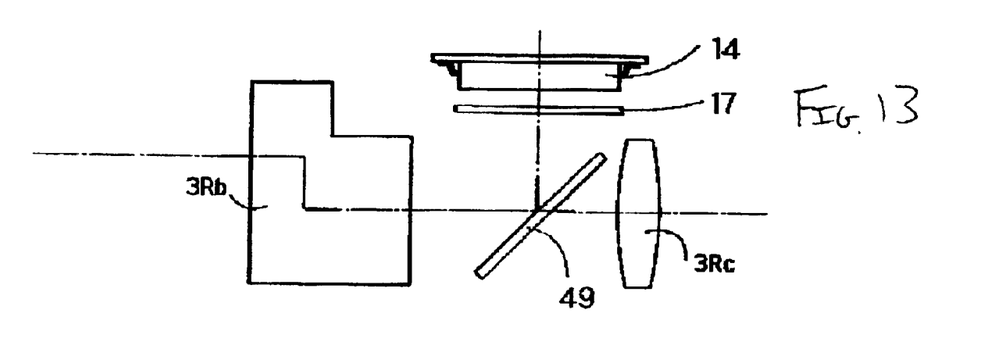
FIG. 13 is a diagram showing a binocular device in still another embodiment of the present invention.

The arrangement may alternatively be such that, as shown in FIG. 13, a half-transmission mirror 49 is provided as a reflection means in the observation optical path R to reflect observation light rightward, and an image formed from this reflected light is received by the CCD 14 placed escaped from the observation optical path R. Observation light passing through the half-transmission mirror 49 travels to the ocular optical system 3Rc, so that the observation object can be observed through the half-transmission mirror 49 and the ocular optical system 3Rc.

Also in this case, the CCD 14 is placed in a position optically equivalent to the first image plane position Ma in the reflected light optical path from the half-transmission mirror 49. That is, the CCD 14 and the half-transmission mirror 49 are placed so that the optical path length between the half-transmission mirror 49 and the CCD 14 and the optical path length between the half-transmission mirror 49 and the first image plane position Ma are equal to each other.

Figure 14:
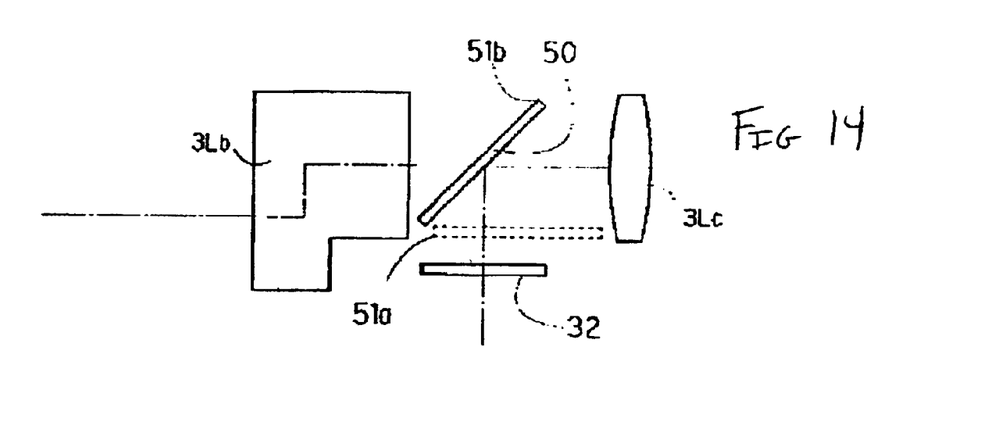
FIG. 14 is a diagram showing a binocular device in a further embodiment of the present invention.

While the embodiment has been described with reference to FIGS. 1 through 11 with respect to the arrangement in which the liquid crystal display panel 32 is set in the inserted position corresponding to the first image plane position Mb to enable direct observation of an image displayed on the liquid crystal display panel 32, an arrangement such as shown in FIG. 14 may alternatively be used in which a all reflecting mirror 50 provided as a reflection means can be displaced between a retracted position 51a escaped from the observation optical path L, indicated by the dotted line, and an inserted position 51b in the observation optical path L, in which, when the all reflecting mirror 50 is displaced to the inserted position 51b, light of a display image reflected by the all reflecting mirror 50 travels to the ocular optical system 3Lc, and in which, when the all reflecting mirror 50 is displaced to the retracted position 51a, observation light travels to the ocular optical system 3Lc.

Figure 15:
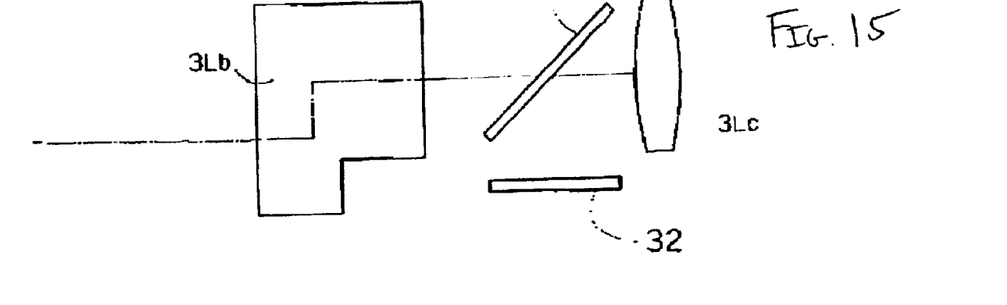
FIG. 15 is a diagram showing a binocular device in accordance with a further embodiment of the present invention.

In this case, the liquid crystal display panel 32 is placed in a position optically equivalent to the first image plane position Mb. That is, the all reflecting mirror 50 and the liquid crystal display panel 32 are placed so that the optical path length between the all reflecting mirror 50 displaced to the inserted position 51b and the liquid crystal display panel 32 and the optical path length between the all reflecting mirror 50 displaced to the inserted position 51b and the first image plane position Mb are equal to each other. The arrangement may alternatively be such that, as shown in FIG. 15, a half-transmission mirror 52 is provided as a reflection means in the observation optical path L and a displayed image reflected by the half-transmission mirror 52 is observed through the ocular optical system 3Lc. Observation light passing through the half-transmission mirror 52 without being reflected by the same travels to the ocular optical system 3Lc, so that the observation object can be observed through the half-transmission mirror 52 and the ocular optical system 3Lc. That is, both the image displayed on the liquid crystal display panel 32 and reflected by the half-transmission mirror 52 and the observation light passing through the half-transmission mirror 52 can be observed simultaneously.

Also in this case, the liquid crystal display panel 32 is placed in a position optically equivalent to the first image plane position Mb.

The embodiments of the present invention have been described with respect to the arrangements in which the position of the focal plane of the ocular optical system 3Lc corresponds to the first image plane position Mb and, therefore, the liquid crystal display panel 32 is set in the position corresponding to the first image plane position Mb or in the position optically equivalent to the same. An image displayed on the liquid crystal display panel 32 can be observed in an in-focus condition when the liquid crystal display panel 32 is set in the position corresponding to the focal plane of the ocular optical system 3Lc or in the position optically equivalent to the same. That is, if the liquid crystal display panel 32 is set in the position corresponding to the focal plane of the ocular optical system 3Lc or in the position optically equivalent to the same, it is not necessary to set the liquid crystal display panel 32 in the position corresponding to the first image plane position Mb or in the position optical equivalent to the same as in the above-described embodiments.

Accordingly, the arrangement may be such that, for example, when an image displayed on the liquid crystal display panel 32 is observed through the ocular optical system 3Lc, the focal plane position of the ocular optical system 3Lc is shifted from the first image plane position Mb and the liquid crystal display panel 32 is inserted at the focal plane position shifted from the first image plane position Mb.

Figure 16:
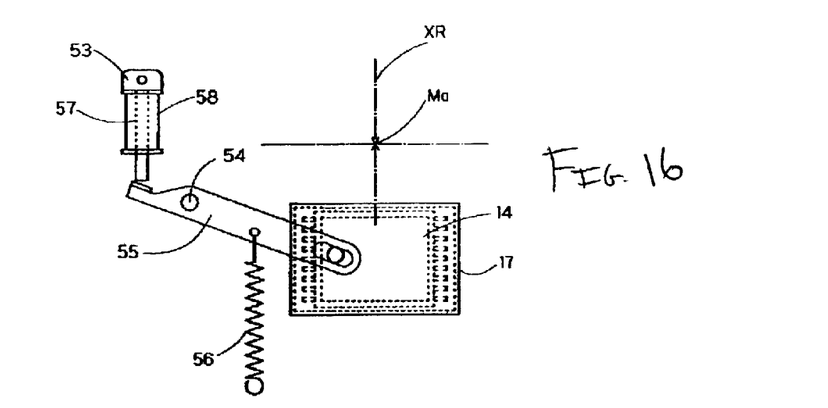
FIGS. 16 and 17 are diagrams showing a binocular device in accordance with a further embodiment of the present invention.
Figure 17:
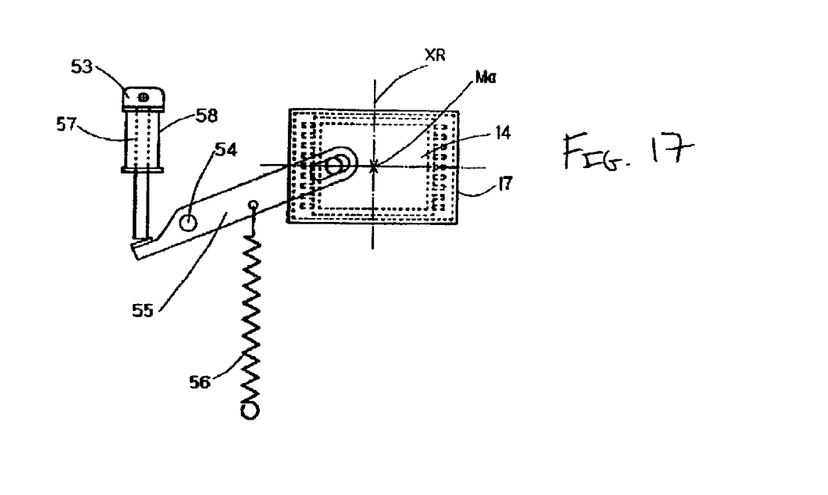

FIGS. 16 and 17 show an arrangement in which a plunger 53 is used to displace the CCD 14 between the position corresponding to the first image plane position Ma and the retracted position escaped from the observation optical path R. The CCD supporting plate 16 on which the CCD 14 is supported is moved in a vertical direction relative to the observation optical path R. When the CCD supporting plate 16 is displaced downward as shown in FIG. 16, the CCD 14 is set in the retracted position escaped from the observation optical path R. When the CCD supporting plate 16 is displaced upward as shown in FIG. 17, the CCD 14 is set in the inserted position corresponding to the first image plane position Ma.

The plunger 53 and the CCD supporting plate 16 are linked by a lever 55 having a shaft 54 supported so as to be ratable relative to the casing 2. The plunger 53 is placed on the left-hand side of the shaft 54, while the CCD supporting plate 16 is placed on the right-hand side of the shaft 54.

A spring 56 is stretched between the casing 2 and a portion of the lever 55 on the right-hand side of the shaft 54. The lever 55 is urged downward, i.e., clockwise about the shaft 54, by the spring 56. When a coil (not shown) fitted in the plunger 53 is energized, a movable piston 57 projects out of a cylinder 58 of the plunger 53 as shown in FIG. 17 to rotate the lever 55 counterclockwise against the urging force of the spring 56. The CCD 14 is thereby displaced upward to be set in the inserted position corresponding to the first image plane position Ma.

When energization of the plunger 53 is stopped, the lever 55 rotates clockwise by the urging force of the spring 56 contracting to the original state. The CCD 14 is thereby displaced to be set in the retracted position escaped from the observation optical path R, as shown in FIG. 16.

If energization of the plunger 53 is performed in a linked relationship with the switching-on operation of the release button 27, displacement of the CCD 14 to the first image plane position Ma and storage of image data on an observed image can be performed at a time by the switching-on operation of the release button 27. Each of the infrared cut filter 17 and the liquid crystal display panel 32 may also be displaced by driving with a plunger such as that described above.

According to the present invention, as described above, an image pickup unit is provided in one of two observation optical systems of a binocular device, and a display unit for displaying an image obtained through the image pickup unit is provided in the other observation optical system, thereby enabling an image of an observed object to be stored and enabling the stored image to be displayed on the display unit. Consequently, images obtained by image pickup operation can be reproduced and checked on the site.

What is claimed is:

1. A binocular device comprising:
   a pair of observation optical systems each including an objective optical system and an ocular optical system;
   image pickup means for obtaining an image formed from observation light at a first image plane position in one of the pair of observation optical systems; and
   display means for displaying at a focal plane position in the ocular optical system of the other observation optical system the image obtained by the image pickup means,
   the image pickup means being displaced between the first image plane position in the observation optical system and a retracted position escaped from the optical path of the observation optical system.

2. The binocular device according to claim 1, wherein the image pickup means may be placed in a position escaped from the optical path of the observation optical system, which position is optically equivalent to the first image plane position of the observation optical system, and reflection means for causing observation light at the first image plane position to travel to the image pickup means maybe provided.

3. The binocular device according to claim 2, wherein the reflection means is displaced between an inserted position in the optical path of the observation optical system and a retracted position escaped from the optical path of the observation optical system, and the reflection means causes observation light at the first image plane position to travel to the image pickup means when it is set in the inserted position.

4. The binocular device according to claim 2, wherein the reflection means is formed as a half-transmission mirror.

5. The binocular device according to claim 1, further comprising an infrared cut filter displaced between a position to cover the image pickup surface of the image pickup means and a position not to cover the image pickup surface.

6. The binocular device according to claim 1, wherein the display means is displaced between the focal plane position of the ocular optical system in the other observation optical system and a retracted position escaped from the optical path of the other observation optical system.

7. The binocular device according to claim 1, wherein the display means is placed in a position escaped from the optical path of the other observation optical system, which position is optically equivalent to the focal plane position In the ocular optical system of the other observation optical system, and reflection means for causing light from an image displayed on the display means to travel to the ocular optical system is provided.

8. The binocular device according to claim 7, wherein the reflection means is displaced between an inserted position in the optical path of the other observation optical system and a retracted position escaped from the optical path of the other observation optical system, and the reflection means causes light from an image displayed on the display means to travel to the ocular optical system when it is set in the inserted position.

9. The binocular device according to claim 7, wherein the reflection means is formed as a half-transmission mirror.

10. The binocular device according to claim 1, further comprising a connection portion for outputting an image obtained by the image pickup means to an external device.

* * * * *